June 12, 1951  J. H. GEISSE  2,556,873
AIRCRAFT INSTRUMENT RESPONSIVE
TO YAW AND ANGLE OF ATTACK
Filed April 7, 1944
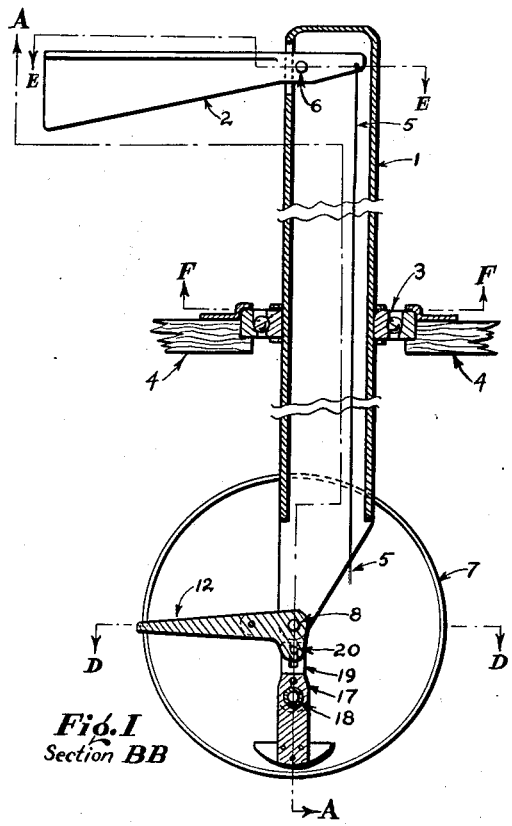
Fig. I Section BB
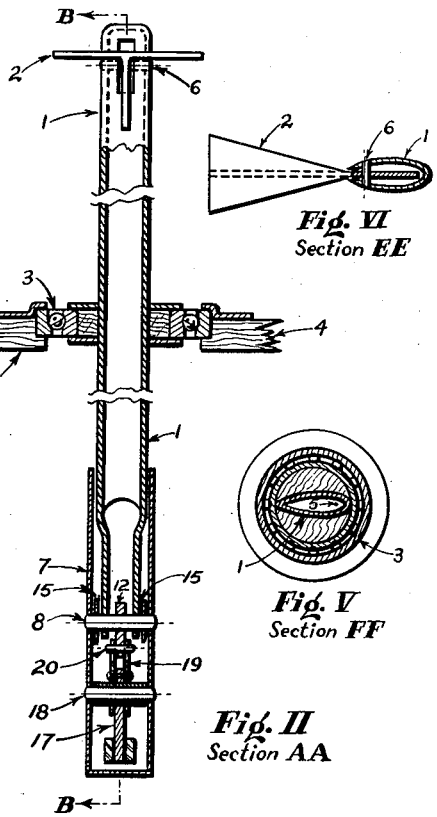
Fig. II Section AA
Fig. V Section FF
Fig. VI Section EE
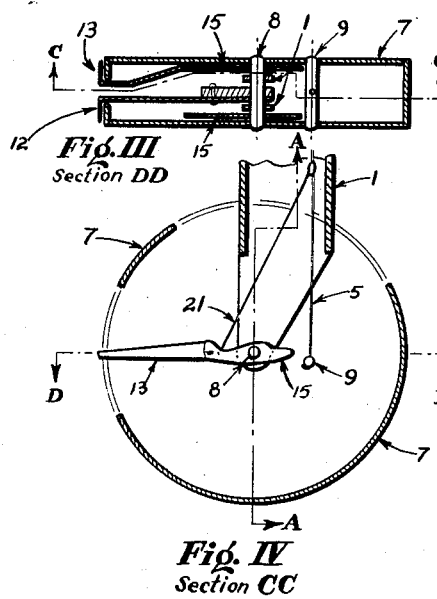
Fig. III Section DD
Fig. IV Section CC
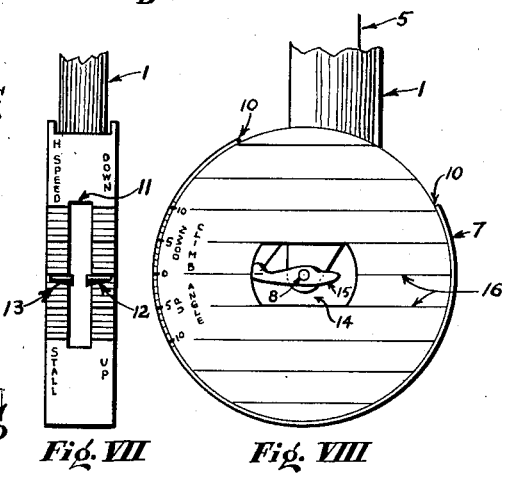
Fig. VII
Fig. VIII
Inventor
John Harlin Geisse Patented June 12, 1951

2,556,873

UNITED STATES PATENT OFFICE 2,556,873

AIRCRAFT INSTRUMENT RESPONSIVE TO YAW AND ANGLE OF ATTACK

John Harlin Geisse, Madison, Wis., assignor, by mesne assignments, to Kollsman Instrument Corporation, Elmhurst, N. Y., a corporation of New York Application April 7, 1944, Serial No. 530,054

9 Claims. (Cl. 73—178)

This invention relates to improvements in aircraft instruments, and has for its object the provision of an instrument responsive to yaw and angle of attack of the aircraft which will more effectively warn the pilot of the attitude of the aircraft and of dangerous flight conditions than do instruments now commonly used.

Another object of the invention is the provision of an aircraft instrument for directly indicating to the pilot the direction of aircraft travel by providing a visual line of sight forwardly of the aircraft which is maintained parallel to the flight path of the aircraft.

Another object of the invention is the provision of an aircraft instrument in accordance with the preceding object in which the visual line of sight is controlled in response to both yaw and angle of attack of the aircraft so as to provide for visual sighting by the pilot of the vertical and lateral path of the aircraft with respect to forward objects.

Another object of the invention is the provision of an aircraft instrument in which there is provided an indication of longitudinal axis or silhouette of the aircraft and a reference, with the means and reference relatively rotatable to provide a direct visual indication of the angle of attack of the aircraft.

Another object of the invention is the provision of an aircraft instrument for indicating the characteristics of an aircraft in flight, in which there is provided indicia of air speed or angle of attack with an indicator therefor controlled in response to the aircraft angle of attack in flight.

Another object of the invention is the provision of an aircraft instrument combining means responsive to angle of attack and a pendulum so as to indicate the dive angle of the aircraft in flight.

Other objects and features of the invention will be readily apparent to those skilled in the art from the specification and appended drawing illustrating certain preferred embodiments in which:

Figure I is a vertical section through an aircraft instrument according to the present invention, taken on the line BB of Figure II.

Figure II is a vertical sectional view on the line AA of Figure I.

Figure III is a horizontal sectional view on the line DD of Figure I.

Figure IV is a vertical sectional view on the line CC of Figure III.

Figure V is a horizontal sectional view on the line FF of Figure I.

Figure VI is a horizontal sectional view taken on the line EE of Figure I.

Figure VII is a front view of the indicating portion of the instrument.

Figure VIII is a side view of the indicating portion of the instrument.

The aircraft instrument according to this invention, as specifically illustrated in the drawing, comprises an elongated stream-lined tubing 1 supported within a bearing 3 in the roof 4 of the cockpit of the aircraft. At the upper end of the tube 1 is pivotally mounted a weather vane 2 upon a pivot 6 about which the vane 2 rotates in a vertical plane under the influence of the air currents passing over the vane as the aircraft travels in flight. The vane 2 rotates in the horizontal plane under the influence of the air currents to effect rotation bodily of the tube 1 about its longitudinal axis in the bearing 3. At the interior end of the tube 1 there is supported a casing or main body portion 7 of the indicating instrument, being rotatably supported upon a pin 8 mounted in the opposite legs of the lower portion of the tube 1. Between the interior end of the vane 2 and a pin 9 in the casing 7 is attached an actuating wire 5 to effect rotation of the casing 7 about its pivot 8 in response to rotation of the vane 2 in a vertical plane about its pivot 6. The wire 5 may be sufficiently rigid to effect rotation of casing 7 in a clockwise direction as viewed in Figure IV, or the casing may be weighted or biased in conventional manner to effect the return movement. The periphery of casing 7 is cut away at 10 to permit its rotation relative to the tubing 1.

The opposite sides of the casing 7 are provided with a plurality of parallel sighting lines 16 which are always disposed parallel to the axis of the vane 2 and, hence, always parallel to the direction of travel of the aircraft regardless of the direction in which the fore and aft axis of the aircraft is pointing. These sighting lines provide references giving visual lines of sight for the pilot forwardly of the aircraft to provide him with a direct visual indication of the vertical and lateral path of the aircraft.

As is well known, the direction of travel of the aircraft through the air is independent of the angle of its fore and aft axis with respect to the vertical and horizontal planes; thus, an aircraft may be descending at a relatively steep glide angle while its nose is pointed upwardly. In view of this characteristic of the aircraft, it is difficult for the pilot to determine a landing point or clearance or non-clearance of his craft with respect to elevated obstacles in the flight path. Regardless of the position of the fore and aft axis of the aircraft, the longitudinal axis of the vane 2 will always be parallel to the direction of travel of the aircraft through the air. The reference lines 16 which provide visual lines of sight will always be parallel to the longitudinal axis of the vane 2 and, therefore, will always be parallel to the direction of travel of the aircraft regardless of the position of the fore and aft axis of the aircraft with respect to the horizontal and vertical planes. Therefore, by sighting along the visual lines of sight provided by the reference lines 16, the pilot will always be able to determine the future position to be arrived at by the aircraft in accordance with its direction of travel. Stated differently, assuming a constant glide path for the aircraft, the reference lines 16 provide visual lines of sight which will point to that place on the earth toward which the aircraft is travelling and which it would contact if making a landing. Similarly, by sighting along the visual lines of sight provided by the reference lines 16, the pilot can determine whether or not the future position of the aircraft will clear an elevated object in the flight path and also whether the future position of the aircraft will go to the right or left of such elevated object. The visual lines of sight provided by the reference lines 16 have their position determined angularly about the horizontal axis by the angle of attack of the aircraft in response to movement of the vane 2 and about the vertical axis by the angle of yaw of the aircraft as also determined from the vane 2.

The opposite sides of the casing 7 are provided with window openings 14 covered with transparent material through which two airplane silhouettes 15 are individually viewable, each through its respective window. The aircraft silhouettes 15 are freely rotatably mounted upon the pin 8 and are actuated by wires 21 connected to the wire 5. The casing 7 and the aircraft silhouettes 15 are rotated in opposite directions about the pivot 8 in response to rotation of the vane 2 about its pivot 6. This results in a relative rotation which is a multiple of angle of attack depending upon the radii of the points of wire attachment with respect to the pivots 8 and 6. As illustrated in the drawing, and herein explained, the casing 7 is rotated through the same angle as the vane 2 and, hence, equal to the angle of attack so that the visual sighting lines 16 will remain parallel to the longitudinal axis of the vane. When the rotation of the aircraft silhouettes 15 is added to the rotation of casing 7, the resulting position of the aircraft silhouettes 15 with relation to lines 16 becomes an increased multiple of the angle of attack which will more clearly indicate to the pilot the angle of attack under which the aircraft is operating, since the added angular movements will increase the sensitivity of the instrument with respect to the pilot's visual interpretation of critical changes in angle of attack.

When the aircraft is not yawed, the longitudinal axis of the vane 2 and of the sighting lines 16 will lie substantially in the same vertical plane as the fore and aft axis of the aircraft or parallel thereto.

If the aircraft should yaw, the instrument will be bodily rotated about a vertical axis in a direction depending upon the direction of yaw so as to rotate the front of the instrument to the side of the pilot's vision. The angle of yaw of the aircraft is indicated to the pilot by the angle through which the indicating instrument rotates with respect to the plane of the fore and aft axis of the aircraft.

The front of the casing 7 is cut out at 11 to provide a slot for the passage therethrough of the indicator pointers for the instrument. The aircraft silhouette 15 shown in Figure I and at the upper portion of Figure III is provided with an extended tail which projects through slot 11 and terminates in the indicator 13. The left hand side of the casing front opposite slot 11 is provided with indicia which may be properly calibrated in angle of attack, or which may be graduated in units of air speed, or both. If graduated in air speed, the instrument will of course be correct for only a particular overall airplane weight and then only in the absence of acceleration.

Upon a pin 18 in the casing 7 is rotatably supported a simple pendulum 17 having a slotted extension 19 which engages a pin 20 supported in the indicator 12 which is, in turn, rotatably supported by the pin 8. The pendulum 17 is connected only to the indicator 12 so that the position of the indicator is determined by the action of gravity upon the pendulum 17, in the absence of acceleration, and is independent of the fore and aft attitude of the aircraft. Since the position of indicator 12 is determined solely by the vertical location of pendulum 17 and the position of casing 7 is determined by the vane 2 responsive to angle of attack, the position of indicator 12 with respect to casing 7 will, in the absence of acceleration, indicate the angle of climb or descent. The right hand front of casing 7 opposite slot 11 is accordingly provided with indicia properly calibrated to read the angle of climb or descent of the aircraft.

In the operation of the instrument, it is installed in the aircraft in such a position that the vane 2 operates in air undisturbed by the aircraft or air whose direction of movement relative to the aircraft bears a constant relation to the angle of attack of the aircraft and the casing 7 is preferably ahead of the pilot and approximately at a level with his eyes, with the front face shown in Figure VII facing the pilot. The vane 2 as previously explained is movable and its position is determined solely by its direction of travel relative to the air and is entirely independent of the attitude of the aircraft and of the fore and aft axis of the aircraft with respect to both the vertical and horizontal planes.

If the aircraft is yawed, the vane 2 will move so that its longitudinal axis is moved through a horizontal angle with respect to the fore and aft axis of the aircraft, this horizontal angle being equal to the angle of yaw and causing the entire instrument to move bodily about its vertical axis through the same horizontal angle with respect to the fore and aft axis of the aircraft. This angle, measured or visually estimated by the pilot, will indicate to him the angle of yaw of the aircraft. Ordinarily the exact value of the angle of the yaw is not critcal and it is only the sense of the indication of yaw and its direction which is material to the pilot. The vane 2 and the casing 7 will maintain their position at a horizontal angle with respect to the fore and aft axis of the aircraft so long as the yaw continues and the axes of vane 2 and of the aircraft will again be in the same or parallel vertical planes when the aircraft is again moving in a direction parallel to its fore and aft axis.

As the angle of attack of the aircraft changes, the vane 2 will rotate about its axis 6 so as to maintain an angle between the longitudinal axis of the vane 2 and the chord of the aircraft wings which is identical to the angle of attack of the aircraft. The casing 7 of the instrument will be rotated through wire 5 so that its reference lines 16, which provide visual sighting lines, remain parallel to the longitudinal axis of the vane 2 and hence parallel to the direction of flight of the aircraft relative to the air. In calm air, therefore, the pilot will be enabled to determine the direction of motion of the aircraft relative to the ground or any elevated obstacle by sighting along the lines 16 providing the visual line of sight and, by their coincidence with the ground and their relation to an elevated obstacle, they will indicate to the pilot the future position to be arrived at by the aircraft.

The airplane silhouettes 15 and the indicator 13 are rotated in directions opposite to the rotation of the casing 7 by means of the wires 21 as the wire 5 is moved by the pivoting of vane 2 in a vertical direction as the angle of attack changes. They will, therefore, assume positions relative to the casing 7 which are directly proportional to the rotational movement of the vane 2 and hence to the angle of attack of the aircraft. With the scale cooperating with indicator 13 graduated in properly calibrated indicia of angle of attack, the position of indicator 13 relative to the indicia will provide for a direct reading of angle of attack under which the aircraft is operating. With the scale cooperating with indicator 13 graduated in properly calibrated units of air speed, the position of the indicator relative to the indicia will provide for a reading of a normally fictitious air speed but which, being controlled by the angle of attack, provides a safety feature in that the reading of air speed corresponding to stall or other operational characteristic of the airplane will remain constant regardless of the load carried and the loading applied due to acceleration.

In the absence of acceleration, the position of indicator 12 will be determined by the vertical position of the pendulum 17 and the rotation of the casing 7 relative thereto will directly indicate the angle of flight path of the aircraft relative to the vertical. Since the relative rotation between the casing 7 and the indicator 12 is proportional to the rotation of the casing 7 relative to the force acting on the pendulum 17, the rotation of casing 7 being directly determined by the direction of travel of the aircraft, and since in the absence of acceleration the force acting on the pendulum is gravity, the position of the indicator 12 relative to the indicia with which it is associated will provide for a direct reading of the angle of climb or descent of the aircraft.

The advantages of the instrument of this invention are principally as follows:

It provides the pilot with a direct indication of his flight path in the air by providing visual lines of sight forwardly of the aircraft which are maintained parallel to the flight path of the aircraft. Without such an indication, it is difficult for a pilot to detect his flight path with respect to the ground and forward objects since the flight path in normal flight may vary as much as 15% relative to the aircraft axis.

The angular position of the airplane silhouettes 15 relative to the parallel reference lines 16 being a multiple of the angle of attack of the aircraft will be a constant warning to the pilot against inadvertent stalling. This is particularly true in steeply banked turns, and other conditions in which a load due to acceleration is applied to the plane, where the angle of attack is not so apparent to the pilot.

With the indicator 13 cooperating with indicia of air speed, a safety feature is added in that the indicia scale can be marked in red or other salient marking in the region of the stalling angle and this danger reading will be the same regardless of the load being carried and regardless of the attitude of the flight, particularly since the relative positions of the indicator and scale will change under loading due to acceleration, in contrast to regular air speed meters which do not have any such fixed region or hazardous operation, but respond only to the indicated air speed of the aircraft which may remain high while the aircraft is in a dangerous stalling condition due to load carried and loading due to aircraft acceleration. Also, since the most efficient aircraft operation is always at the same angle of attack, irrespective of the load carried, the proper attitude of the airplane for its most efficient flight and for maximum gliding range would be indicated to the pilot by the cooperation of the indicator and scale which may be similarly provided with a salient marking.

The direct indication of the angle of yaw by the rotation bodily of the instrument about a vertical axis has distinct advantages over the indirect indication now given with the ball-bank indicator. The ball-bank indicator under some conditions will not indicate an existing yaw and in all cases the relationship between the angle of yaw and the angular displacement of the ball is a function of air speed and the resistance of the aircraft to sidewise motion. Furthermore, the direct indication of yaw herein provided will encourage the pilot to correct the yaw with the rudder whereas the ball-bank, because of its similarity to a spirit level, encourages the pilot to correct the yaw with the ailerons.

It will be apparent that many modifications from the particular instrument described could be made by anyone skilled in the art within the scope of the appended claims without sacrificing any of the advantages of the invention.

What is claimed is:

1. In an aircraft instrument, means providing an indication of the longitudinal axis of the aircraft, means providing a reference with respect to which said means is relatively rotatable, and means responsive to the angle of attack of said aircraft for effecting relative rotation between said first two mentioned means to visually indicate by their relative positions the aircraft angle of attack.

2. In an aircraft instrument, means providing an indication of the longitudinal axis of the aircraft, means providing a reference with respect to which said means is disposed, and means responsive to the angle of attack of the aircraft for effecting relative rotation of said first two mentioned means through an angle proportional to the angle of attack of the aircraft to visually indicate by their relative positions the value of angle of attack.

3. In an aircraft instrument, means providing an indication of the longitudinal axis of the aircraft, means providing a reference with respect to which said means is disposed, and means responsive to the angle of attack of the aircraft for rotating said first mentioned means in one direction and said second mentioned means in the opposite direction simultaneously in response to the movement of the means responsive to the angle of attack and through an angle proportional to the change in angle of attack whereby the position of said first mentioned means relative to the reference provides an indication of the aircraft angle of attack.

4. In an aircraft instrument for indicating the position of an aircraft in flight, means freely movable to maintain a position parallel to the direction of travel of the aircraft, a first indicating means movable by said parallel means, a second indicating means movable by said parallel means in a direction opposite to the direction of movement of the first indicating means, the relative movement of said indicating means being a function of the change of the angle of attack of the aircraft whereby the position of said first indicating means relative to said second indicating means will indicate the aircraft angle of attack.

5. In an aircraft instrument for indicating the position of an aircraft in flight, means freely movable to maintain a position parallel to the direction of travel of the aircraft, a first indicating means movable by said parallel means, a second indicating means movable by said parallel means in a direction opposite to the movement of said first indicating means, a third indicating means movable by said parallel means in a direction opposite to the movement of said first indicating means, one of said first and second indicating means bearing indicia readable with respect to the position of the other relative thereto, said first indicating means being provided with a reference with respect to which said third indicating means is disposed, the relative positions of said third indicating means and reference indicating the angle of attack of the aircraft.

6. In an aircraft instrument for indicating the position and direction of travel of an aircraft in flight, means freely movable to maintain a position parallel to the direction of travel of the aircraft, a first indicating means movable by said parallel means, a second indicating means movable by said parallel means in a direction opposite to the movement of said first indicating means, a third indicating means movable by said parallel means in a direction opposite to the movement of said first indicating means, one of said first and second indicating means bearing indicia readable with respect to the position of the other relative thereto, said first indicating means being provided with a line of sight for indicating the direction of travel of the aircraft, said third indicating means being disposed relative to said line of sight and indicating by its position relative thereto the angle of attack of the aircraft.

7. In an aircraft instrument for indicating position of an aircraft in flight, means freely movable to maintain a position parallel to the direction of travel of the aircraft, a first indicating means movable by said parallel means, a second indicating means movable by said parallel means, a third indicating means movable by said parallel means in a direction opposite to the direction of the first indicating means, one of said first and second indicating means bearing indicia readable with respect to the position of the other relative thereto, said first and third indicating means being relatively movable as a function of the angle of attack of the aircraft to provide an indication thereof.

8. In an aircraft instrument for indicating the position and direction of travel of an aircraft in flight, means freely movable to maintain a position parallel to the direction of travel of the aircraft, a first indicating means movable by said parallel means, a second indicating means movable by said parallel means in a direction opposite the movement of said first indicating means, a third indicating means movable by said parallel means in a direction opposite to the movement of said first indicating means, a fourth indicating means, a pendulum operating upon said fourth indicating means to determine the position thereof, one of said first and second indicating means bearing indicia readable with respect to the position of the other relative thereto, one of said first and fourth indicating means bearing indicia readable with respect to the position of the other relative thereto, and said third and first indicating means by their relative positions providing a visual indication of the angle of attack of the aircraft.

9. In an aircraft instrument for indicating the position and direction of travel of an aircraft in flight, means freely movable to maintain a position parallel to the direction of travel of the aircraft, a first indicating means movable by said parallel means, a second indicating means movable by said parallel means in a direction opposite the movement of said first indicating means, a third indicating means movable by said parallel means in a direction opposite to the movement of said first indicating means, a fourth indicating means, a pendulum operating upon said fourth indicating means to determine the positions thereof, one of said first and second indicating means bearing indicia readable with respect to the position of the other relative thereto, one of said first and fourth indicating means bearing indicia readable with respect to the position of the other relative thereto, said third and first indicating means by their relative positions providing a visual indication of the angle of attack of the aircraft, said first indicating means being provided with a line of sight for indicating the direction of travel of the aircraft.

JOHN HARLIN GEISSE.

REFERENCES CITED

The following references are of record in the file of this patent:

UNITED STATES PATENTS

| Number | Name | Date |
|---|---|---|
| 1,183,638 | Glasser | May 16, 1916 |
| 1,332,810 | Danielson | Mar. 2, 1920 |
| 1,360,102 | Ericson | Nov. 23, 1920 |
| 1,777,282 | Constantin | Oct. 7, 1930 |
| 2,027,613 | Pierce, Jr. | Jan. 14, 1936 |
| 2,055,495 | Howard et al. | Sept. 29, 1936 |
| 2,277,625 | Baynes | Mar. 24, 1942 |

FOREIGN PATENTS

| Number | Country | Date |
|---|---|---|
| 54,347 | Austria | July 10, 1912 |
| 604,387 | France | Jan. 25, 1926 |
| 416,766 | Great Britain | Sept. 20, 1934 |